(12) United States Patent
Fouache et al.

(10) Patent No.: US 8,709,527 B2
(45) Date of Patent: Apr. 29, 2014

(54) GRANULATED SWEETENING COMPOSITION

(75) Inventors: Catherine Fouache, Sailly Labourse (FR); Philippe Fouache, legal representative, Sailly Labourse (FR); Elsa Muller, Gonneham (FR); Guillaume Ribadeau-Dumas, Verlinghem (FR); Beatrice Toursel, Gonnehem (FR); Liuming Zhou, Macomb, IL (US)

(73) Assignee: Roquette Freres, Lestrem (FR)

( * ) Notice: Subject to any disclaimer, the term of this patent is extended or adjusted under 35 U.S.C. 154(b) by 381 days.

(21) Appl. No.: 11/873,610

(22) Filed: Oct. 17, 2007

(65) Prior Publication Data

US 2009/0226590 A1 Sep. 10, 2009

(30) Foreign Application Priority Data

Oct. 17, 2006 (FR) ..................................... 06 09085

(51) Int. Cl.
*A23G 3/00* (2006.01)
*A23L 1/236* (2006.01)

(52) U.S. Cl.
USPC ........................... 426/658; 426/660; 426/548

(58) Field of Classification Search
USPC ............................................ 426/548, 804, 48
See application file for complete search history.

(56) References Cited

U.S. PATENT DOCUMENTS

| 3,915,736 | A | 10/1975 | Oyamada et al. |
| 5,629,042 | A * | 5/1997 | Serpelloni et al. ............. 426/660 |
| 6,630,586 | B1 * | 10/2003 | Fouache et al. ............... 536/103 |
| 6,743,456 | B1 | 6/2004 | Ribadeau-Dumas et al. |
| 6,780,990 | B1 | 8/2004 | Le |
| 6,875,460 | B2 | 4/2005 | Cunningham et al. |
| 2002/0192343 | A1 * | 12/2002 | Serpelloni ..................... 426/548 |
| 2006/0112956 | A1 * | 6/2006 | Serpelloni ....................... 127/34 |
| 2006/0147597 | A1 | 7/2006 | Duflot et al. |

FOREIGN PATENT DOCUMENTS

WO WO 2004043166 A1 * 5/2004

* cited by examiner

Primary Examiner — Humera Sheikh
Assistant Examiner — Tynesha McClain-Coleman
(74) Attorney, Agent, or Firm — Young & Thompson

(57) ABSTRACT

A granulated sweetening composition, includes:
a poorly soluble polyol with a water solubility of less than 60 g/100 g of solution at 20° C.,
a hydrogenated dextrin with a molecular weight between 3000 and 5000 daltons,
maltitol. A process for preparing such a composition is also disclosed.

9 Claims, No Drawings

GRANULATED SWEETENING COMPOSITION

The present invention relates to a novel sweetening composition in powder form intended most particularly for manufacturing sugar-free plain boiled sweets, i.e. sold without individual wrapping.

The invention also relates to a process for preparing such a composition and to its use for the manufacture of boiled sweets.

Boiled sweets, also commonly known as hard sweets, are solid and essentially amorphous confectionery products. They are obtained by rigorous dehydration of carbohydrate syrups. Generally, carbohydrate mixtures containing an amount of water just sufficient to dissolve all the crystals are cooked. These mixtures are then cooked to evaporate a substantial proportion of the water, and the cooking is then completed under vacuum to further lower the water content of the sweet, and to bring it to a value generally of less than 3%. The plastic mass obtained is then cooled, and various ingredients such as flavourings, colorants, acids, plant extracts, vitamins and pharmaceutical active principles are added thereto. The cooked mass is then shaped, by casting or forming, and, after returning to room temperature, boiled sweets with a glassy texture and appearance are obtained.

Boiled sweets are required to be stable over time, i.e. to change as little as possible from the moment at which they are manufactured until the moment at which they are consumed, in order to remain attractive products with a pleasant mouthfeel.

However, boiled sweets are not thermodynamically stable products. The extent of their change depends essentially on their compositions after manufacture, but also on the conditions under which they are stored.

Firstly, boiled sweets may become sticky during storage. When they are paper-wrapped, it becomes difficult or even impossible to remove their paper wrapping before consuming them. They may also cake without remaining individualized, which is even more of a nuisance.

This problematic change towards a sticky and syrupy state is explained by surface and/or depth phenomena.

The surface phenomena are caused by the hygroscopic nature of boiled sweets. Indeed, it is known that boiled sweets, which are virtually anhydrous products, always have very low equilibrium relative humidities, markedly lower than the usual ambient storage relative humidities. This explains why water uptake necessarily takes place at the surface of the sweets as soon as they are exposed to and remain in contact with air. When this water uptake is substantial, it tends to liquefy the surface of the sweets and to give them the characteristics of a syrup, i.e. in particular to give them a sticky nature. The lower the water content of the boiled sweets, the quicker this change appears.

The depth phenomena, which therefore do not concern only the surface but the entire mass of the sweets, are of thermal origin. More specifically, in order for these phenomena to take place, the storage temperature needs to slightly exceed the glass transition temperature of the boiled sweet. The glass transition temperature is the temperature at which, by heating, a vitreous and solid boiled sweet becomes an amorphous syrupy liquid. It is very clearly understood that a boiled sweet can be subject to deformation, or even to a complete flow, when its storage temperature is high and its glass transition temperature is relatively low. The product, which initially has a dry feel, becomes sticky. It should be noted that the higher the water content of the boiled sweet, the more it is subject to a risk of change of this nature during storage.

In conclusion, to avoid boiled sweets becoming sticky products during storage, it has always been seen to be necessary for their water content to be neither too low nor too high.

Secondly, boiled sweets may have a tendency during storage to crystallize uncontrollably and, as a result, to lose their highly attractive vitreous appearance, then more resembling barley sugars, which are very different from the confectionery products that are of interest in the context of the present invention.

This crystallization may take place at the surface or in the core of the sweet.

Surface crystallization requires significant water uptake and corresponds to a complementary evolutionary stage relative to that described above. It also requires a sufficient concentration of crystallizable molecules in the liquefied peripheral layer. When these two conditions are met, crystallization is then observed, which proceeds from the surface of the sweet inwards. This phenomenon, when it is uncontrolled, is known as turning. It makes the sweets totally opaque and white, which is not desired.

Crystallization may also take place very directly at the core of the boiled sweet if it is very water-rich or if the storage temperature is too high. Under these conditions, the boiled sweet is then excessively soft and can no longer be considered a true solid. It is then rather a case of a liquid supersaturated with crystallizable molecules, whose change towards a crystalline state is inevitable and virtually spontaneous. Specialists refer to this type of crystallization as graining.

In summary, in order for boiled sweets not to be unstable and for them not to become sticky, turned or grainy products over time, it has always appeared imperative to adjust, on the one hand, their water content, and, on the other hand, their content of crystallizable molecules.

After their manufacture, the boiled sweets obtained are either individually paper-wrapped before being bagged, or are placed directly in bags or cardboard boxes, without individual wrapping. In the latter case, the boiled sweets are said to be "plain".

At the present time, in order to be able to prepare boiled sweets that are sufficiently stable to moisture and to heat, syrups of isomalt and/or hydrogenated starch hydrolysates are most commonly used. Although the combination of these two products has, admittedly, made it possible to limit the water uptake of the sweets obtained, especially due to the sparingly hygroscopic nature of isomalt, it has led to a substantial increase in the cost of the sweet and a very substantial loss of sweetening power. Indeed, isomalt is an expensive product and, as a result, is poorly suited as a filler for mass-produced products. Moreover, isomalt contains about 5% water of crystallization and thus requires high cooking temperatures to enable dehydration of the syrup sufficient to obtain a quality boiled sweet.

In document U.S. Pat. No. 5,236,719, a dextrin whose low molecular weight compounds have been removed by chromatography is used in combination with xylitol, sorbitol or maltitol in the manufacture of boiled sweets. However, since the polyols combined with the dextrin are highly soluble, they do not crystallize at the surface of the boiled sweet. On the contrary, as soon as the boiled sweets based on this composition come into contact with the atmosphere, they have a tendency to take up water and become sticky. Consequently, the boiled sweets thus prepared must imperatively be individually wrapped to limit this water uptake.

An alternative has been found by the Applicant Company, which describes in document EP 0 954 982 B1 sweetening compositions intended for replacing isomalt, which comprise one or more poorly water-soluble polyols (soluble polyols such as maltitol being excluded) and a crystallizing agent comprising oligosaccharides or polysaccharides with a molecular weight of between 1000 and 8000 daltons.

Although these compositions are satisfactory in the manufacture of plain stable boiled sweets, they give rise to a new technical problem, in particular when the polyol is mannitol, mainly the appearance of cracks in the boiled sweet (appearance of surface cracks).

Without wishing to be bound by a theory, the Applicant Company believes that this technical problem is due to the instability of the crystalline form of mannitol in the boiled sweet. After extensive research, the Applicant Company has found that in order to obtain a stable plain boiled sweet, a ternary powder composition, comprising a poorly soluble polyol such as mannitol, maltitol and a hydrogenated dextrin in particular and selected proportions should be used for its manufacture. Furthermore, this composition makes it possible to use cooking temperatures that are industrially accessible for the preparation of boiled sweets.

One subject of the invention is thus a granulated sweetening composition, characterized in that it comprises:
    a poorly soluble polyol with a water solubility of less than 60 g/100 g of solution at 20° C.,
    a hydrogenated dextrin with a molecular weight between 3000 and 5000 daltons,
    maltitol.

Preferably, the poorly water-soluble polyol is mannitol.

The composition according to the invention advantageously comprises, by weight relative to the solids, from 27% to 35% mannitol, from 55% to 70% hydrogenated dextrin and from 0.5% to 10% maltitol.

According to one preferred variant of the present invention, the composition is characterized in that it comprises from 30% to 33% mannitol, from 59% to 64% hydrogenated dextrin and from 6% to 7.5% maltitol, these percentages being expressed relative to the dry matter.

The best results were obtained with a composition comprising, by weight relative to the solids, 30% mannitol, 6% maltitol and 64% hydrogenated dextrin.

Beyond 7.5% maltitol, at the mannitol contents under consideration, deformation of the boiled sweets is observed in certain cases, which may be corrected by increasing the molecular weight of the dextrins used.

As will be demonstrated in the examples that follow, other polyols and especially sorbitol were tested in the boiled sweet preparation compared with maltitol, to reduce or prevent the formation of surface cracks, and do not give satisfactory results, unlike maltitol.

As regards the molecular weight of the hydrogenated dextrin, it is advantageously between 3000 and 4500 and better still between 3500 and 4500 daltons.

The hydrogenated dextrin also has a non-hydrogenated DP1 and DP2 content advantageously of less than 0.5% (DP=degree of polymerization).

The term "hydrogenated dextrins" means the products obtained by heating starch with a low moisture content, in the presence of acidic or basic catalysts, followed by hydrogenating, while satisfying the molecular weight condition mentioned above. According to one advantageous embodiment of the present invention, these dextrins have a very low content of DP1 and DP2, this property being obtained by chromatographic purification, membrane filtration, nanofiltration or any other purification technique that a person skilled in the art may readily select from the known practices in the field.

The maltitol may be introduced into the composition according to the invention preferably in the form of crystallized maltitol, but it may also be added in the form of maltitol-rich polyol syrup, especially comprising more than 50% by weight of maltitol.

As regards the water content of said composition, it is advantageously between 2% and 10% and more particularly between 5% and 9%.

Indeed, the composition according to the present invention has the characteristic of being in powder form, so as to ensure higher stability than a formulation in syrup form.

The present invention is also directed towards a process for manufacturing the abovementioned sweetening composition, characterized in that it comprises at least one step of:
    mixing a poorly soluble polyol with a water solubility of less than 60 g/100 g of solution at 20° C., a hydrogenated dextrin with a weight-average molecular weight between 3000 and 5000 daltons, and maltitol,
    drying said mixture according to a technique chosen from the group constituted by atomization, extrusion and granulation.

The sweetening composition according to the present invention is also defined as being a sweetening composition that may be obtained via the process in accordance with the invention.

Preferably, the poorly water-soluble polyol is mannitol.

The composition according to the invention advantageously comprises, by weight relative to the solids, from 27% to 35% mannitol, from 55% to 70% hydrogenated dextrin and from 0.5% to 10% maltitol.

According to one preferred variant, said composition comprises from 30% to 33% mannitol, from 59% to 64% hydrogenated dextrin and 6% to 7.5% maltitol, these percentages being expressed relative to the dry matter.

As regards the molecular weight of the hydrogenated dextrin, it is advantageously between 3000 and 4500 and better still between 3500 and 4500 daltons.

The steps of drying of the mannitol/dextrin/maltitol mixture are techniques that are known to those skilled in the art.

As regards granulation, the process will preferably be performed according to the teaching of patent application EP 1 674 475, of which the Applicant Company is the proprietor. The said granulation comprises the continuous mixing of a syrup comprising mannitol, hydrogenated dextrin and maltitol and simultaneous dispersion of a solid primer in an open rotary container. The primer/syrup weight ratio is advantageously about 4 parts of germ per 1 part of syrup. The germs are obtained either by continuous recycling of a fraction of produced solidified material, or by reconstitution of a similar powder composition. The dry matter of the syrup is adjusted depending on its viscosity by a person skilled in the art, so as to facilitate its use. As a guide, the dry matter may preferably be set at between 75% and 80%, for example 78-79% for better feasibility of the process.

The temperature of the granulator is maintained at about 90° C.

After this step, the granules are matured in a suitable device, preferably a rotary device, at a temperature of between 70 and 80° C. for 30 to 50 minutes. An inclined rotary drum may be used, for example.

After granulation, the matured composition obtained comprises about 2% to 10% and preferably 5% to 9% of residual moisture.

As regards extrusion, an installation comprising at least one extrusion die will be used, the temperature parameters being readily selected by a person skilled in the art as a function of the water content of the composition before drying. The extruded composition is then successively cooled, ground and optionally screened.

The composition according to the invention may also be readily prepared using a granulator of Glatt type, by atomization or by any other drying means known to those skilled in the art and under conditions suited to the chosen equipment, which allows the production of a composition according to the invention.

According to another aspect of the present invention, the use of the sweetening composition in accordance with the invention is not limited to the manufacture of sugar-free boiled sweets for which it has particularly been developed, but may be extended to a use in confectioneries of types other than boiled sweets or to other food or pharmaceutical products, as sweetening filler.

It is possible to add thereto any type of additive, such as colorants, flavourings or active principles, provided that they do not harm its noteworthy properties.

The invention will be understood more clearly on reading the examples that follow, which illustrate, without being limiting, various embodiments of the invention and also the advantages thereby afforded.

EXAMPLE 1

Preparation of a Composition According to the Invention

A syrup comprising, relative to the solids, 30% mannitol, 6% maltitol and 64% of a hydrogenated dextrin with a molecular weight of about 4200 daltons, said dextrin being purified before hydrogenation of the small saccharide molecules of DP1 and DP2 by membrane separation, is prepared.

This syrup is brought to a dry matter content of 79% and is then placed in a thermostatically regulated storage tank, from which it is continuously removed by pumping to ensure its dispersion by means of a nozzle into the granulator.

Simultaneously, crystallization germs are introduced into the granulator, to produce a germ/syrup weight ratio of about 4 parts of germ per 1 part of syrup. The germs are obtained by continuous recycling of a fraction of the solidified material produced beforehand.

The temperature of the granulator is maintained at about 90° C.

The granules obtained after this step are matured by completing the crystallization in a maturation device for about 1 hour. The matured granules obtained are then subjected to drying using air at 75° C. for 30 to 50 minutes. After drying, the matured granules are in the form of powder containing 6% to 9% residual moisture.

EXAMPLE 2

Preparation of Boiled Sweets

The composition obtained in Example 1 is used to prepare boiled sweets, in comparison with isomalt.

The conditions for preparing the boiled sweets are the following:
 preparation of a syrup with a dry matter content of 75%
 cooking of the syrup at 165° C. (180° C. for isomalt)
 addition of citric acid, colorant and flavouring
 shaping of the boiled sweets and cooling.

The stability of the boiled sweets is evaluated by placing them in cardboard boxes, at a relative humidity of 70% and at 30° C., on the one hand, and at 75% relative humidity and at 40° C., on the other hand, for ten days.

During this test, the water uptake of the sweets is evaluated by weighing, and their sticky nature is estimated by shaking the cardboard box.

| 70% RH - 30° C. | Isomalt HBC | Composition according to the invention |
|---|---|---|
| After 1 day | 0+ | 0 |
| After 2 days | + | 0 |
| After 3 days | ++ | 0 |
| After 4 days | ++ | 0 |
| After 7 days | ++ | 0 |
| After 8 days | ++ | 0 |
| After 9 days | ++ | 0 |
| After 11 days | ++ | 0 |

| 75% RH - 40° C. | Isomalt HBC | Mannitol + dextrin HBC |
|---|---|---|
| After 1 day | 0+ | 0 |
| After 2 days | + | 0 |
| After 3 days | ++ | 0 |
| After 4 days | ++ | 0 |
| After 7 days | ++ | 0 |
| After 8 days | ++ | 0 |
| After 9 days | ++ | 0+ |
| After 11 days | ++ | 0 |

0: Non-sticky -
0+: slightly sticky, may be easily detached by shaking
+: sticky: the sweets are difficult to detach from each other
++: very sticky, the sweets cannot be detached from each other These results show that no stickiness or deformation problems were observed for the boiled sweets prepared with a composition according to the invention. After two weeks of storage, the sweets show no surface cracking.

A composition according to Example 1, but not containing maltitol, is tested under the same conditions as the composition according to the invention for the preparation of boiled sweets: the boiled sweets thus prepared rapidly show surface fissures, which clearly demonstrate the role of maltitol in suppressing the cracking of the boiled sweets in accordance with the invention.

EXAMPLE 3

Comparative Example

Boiled sweets are prepared with a composition according to the invention, in which the maltitol was removed or replaced with sorbitol, so as to evaluate the effect on the reduction on the cracking.

Various compositions are prepared comprising from 0 to 5% sorbitol, and without maltitol.

|   | % mannitol | % dextrin* | % sorbitol | t° C. cooking |
|---|---|---|---|---|
| A | 35 | 65 | 0 | 130 |
| B | 35 | 65 | 0 | 150 |
| C | 35 | 65 | 0 | 180 |
| D | 34.5 | 64.5 | 1 | 130 |
| E | 34.5 | 64.5 | 1 | 150 |
| F | 34.5 | 64.5 | 1 | 180 |
| G | 32.5 | 62.5 | 5 | 180 |

*Hydrogenated dextrin with a molecular weight of 4900 daltons

The manufactured boiled sweets are then placed for ten days at 75% relative humidity and at 40° C., after which their appearance is observed with the naked eye, and their stickiness is observed.

Monitoring of the Cracks
D0: No cracks on the samples

|   | 75% RH -40° C. |
|---|---|
| A | + |
| B | ++ |
| C | +++ |
| D | 0+ |
| E | + |
| F | ++ |
| G | 0+ |

Monitoring of the Stickiness

|   | 75% RH -40° C. |
|---|---|
| A | 0 |
| B | 0+ |
| C | 0+ |
| D | + |
| E | + |
| F | 0+ |
| G | ++ |

Following these observations, it is concluded that sorbitol has little effect on reducing the cracking and that, furthermore, a few stickiness problems are encountered after ten days of testing, whereas with maltitol it is possible to make the cracking totally disappear without giving rise to any stickiness phenomena.

The invention claimed is:

1. A granulated sweetening composition in powder form, for the preparation of boiled sweets, comprising:
    a poorly soluble polyol with a water solubility of less than 60 g/100 g of solution at 20° C.;
    from 55% to 70% of a hydrogenated dextrin with a molecular weight between 3000 and 5000 daltons; and
    maltitol,
    wherein,
    the poorly soluble polyol is mannitol, and
    the composition comprises from 27% to 35% mannitol, from 55% to 70% of a hydrogenated dextrin, and from 0.5 to 7.5% maltitol.

2. The composition according to claim 1, wherein the molecular weight of the hydrogenated dextrin is between 3000 and 4500 daltons.

3. The composition according to claim 1, wherein the hydrogenated dextrin has a non-hydrogenated DP1 and DP2 content of less than 0.5%.

4. The composition according to claim 1, further comprising a water content of between 2% and 10%.

5. A process for preparing a granulated sweetening composition in powder form, for the preparation of plain boiled sweets, comprising at least one step of:
    mixing a poorly soluble polyol with a water solubility of less than 60 g/100 g of solution at 20° C., from 55% to 70% weight relative to solids of a hydrogenated dextrin with a molecular weight between 3000 and 5000 daltons, and maltitol; and
    drying said mixture according to a technique selected from the group consisting of atomization, extrusion, and granulation,
    wherein the poorly soluble polyol is mannitol, and the mixture comprises, by weight relative to the solids, from 27% to 35% mannitol, from 55% to 70% of a hydrogenated dextrin and 0.5% to 7.5% maltitol.

6. The process according to claim 5, wherein said hydrogenated dextrin has a non-hydrogenated DP1 and DP2 content of less than 0.5%.

7. The composition according to claim 2, wherein the hydrogenated dextrin has a non-hydrogenated DP1 and DP2 content of less than 0.5%.

8. The composition according to claim 2, further comprising a water content of between 2% and 10%.

9. The composition according to claim 3, further comprising a water content of between 2% and 10%.

* * * * *